(12) United States Patent
Hiruma (10) Patent No.: US 11,254,333 B2
(45) Date of Patent: Feb. 22, 2022

(54) ELECTRONIC CONTROL DEVICE, VEHICLE CONTROL METHOD, AND VEHICLE CONTROL PROGRAM PRODUCT

(71) Applicant: DENSO CORPORATION, Kariya (JP)

(72) Inventor: Keigo Hiruma, Kariya (JP)

(73) Assignee: DENSO CORPORATION, Kariya (JP)

( * ) Notice: Subject to any disclaimer, the term of this patent is extended or adjusted under 35 U.S.C. 154(b) by 141 days.

(21) Appl. No.: 16/717,206

(22) Filed: Dec. 17, 2019

(65) Prior Publication Data
US 2020/0139990 A1    May 7, 2020

Related U.S. Application Data

(63) Continuation of application No. PCT/JP2018/019065, filed on May 17, 2018.

(30) Foreign Application Priority Data

Jun. 23, 2017  (JP) .............................. JP2017-123466

(51) Int. Cl.
*B60W 50/02*    (2012.01)
*B60W 60/00*    (2020.01)

(52) U.S. Cl.
CPC .... *B60W 60/0015* (2020.02); *B60W 50/0205* (2013.01); *B60W 2555/20* (2020.02)

(58) Field of Classification Search
CPC ......... B60W 60/0015; B60W 50/0205; B60W 2555/20; B60W 2030/082; B60W 50/029; G08G 1/16; G08B 21/00; B60R 21/00; G01C 21/34
See application file for complete search history.

(56) References Cited

U.S. PATENT DOCUMENTS

| 9,031,498 B1* | 5/2015 | Bertz ................... H04W 72/04 455/13.1 |
| 2014/0222306 A1 | 8/2014 | Wanami |
| 2016/0001775 A1 | 1/2016 | Wilhelm et al. |

(Continued)

FOREIGN PATENT DOCUMENTS

| JP | 2776161 B2 | 7/1998 |
| JP | 2009286250 A | 12/2009 |

(Continued)

*Primary Examiner* — Peter D Nolan
*Assistant Examiner* — Ashley L Redhead, Jr.
(74) *Attorney, Agent, or Firm* — Harness, Dickey & Pierce, P.L.C.

(57) ABSTRACT

An electronic control device acquires at least one of subject vehicle information, surrounding environment information, and road information, detects an abnormality that has occurred in a vehicle during an autonomous driving based on a first travel plan, identifying a cause of the abnormality based on at least one of a content of the abnormality, the subject vehicle information, the surrounding environment information, and the road information, determines a situation around the vehicle based on at least one of the subject vehicle information, the surrounding environment information, and the road information, determines a target stop position for stopping the vehicle in a stoppable location based on the cause of the abnormality and the situation around the vehicle, and changes the first travel plan to a second travel plan for stopping the vehicle to the target stop position.

16 Claims, 6 Drawing Sheets

(56) References Cited

U.S. PATENT DOCUMENTS

| | | | |
|---|---|---|---|
| 2016/0114811 A1* | 4/2016 | Matsuno | B60W 50/0225 |
| | | | 701/23 |
| 2017/0162051 A1 | 6/2017 | Satoh | |
| 2017/0203744 A1* | 7/2017 | Dagan | G06K 9/00805 |
| 2017/0217429 A1 | 8/2017 | Shioe | |
| 2017/0364070 A1 | 12/2017 | Oba | |
| 2018/0067003 A1* | 3/2018 | Michiwaki | G01L 1/22 |
| 2018/0222424 A1* | 8/2018 | Kodama | B60Q 1/525 |
| 2019/0031202 A1* | 1/2019 | Takeda | B60T 8/171 |

FOREIGN PATENT DOCUMENTS

| | | |
|---|---|---|
| JP | 2010128920 A | 6/2010 |
| JP | 2011-169856 A | 9/2011 |
| JP | 2011210095 A | 10/2011 |
| JP | 2011240816 A | 12/2011 |
| JP | 2014148255 A | 8/2014 |
| JP | 2015-133050 A | 7/2015 |
| JP | 201615142 A | 1/2016 |
| JP | 5862426 B2 | 2/2016 |
| JP | 201684038 A | 5/2016 |
| JP | 2016115356 A | 6/2016 |
| JP | 2017132390 A | 8/2017 |
| WO | WO-2015/190329 A1 | 12/2015 |

* cited by examiner

ELECTRONIC CONTROL DEVICE, VEHICLE CONTROL METHOD, AND VEHICLE CONTROL PROGRAM PRODUCT

CROSS REFERENCE TO RELATED APPLICATIONS

The present application is a continuation application of International Patent Application No. PCT/JP2018/019065 filed on May 17, 2018, which designated the U.S. and claims the benefit of priority from Japanese Patent Application No. 2017-123466 filed on Jun. 23, 2017. The entire disclosures of all of the above applications are incorporated herein by reference.

TECHNICAL FIELD

The present disclosure relates to an electronic control device, a vehicle control method, and a vehicle control program product.

BACKGROUND

In recent years, development for an autonomous driving of vehicles has been advanced. In particular, an autonomous vehicle in which an in-vehicle system autonomously performs all of acceleration, steering, and braking of the vehicle, and a driver manually drives the vehicle only when requested by the system has been actively developed.

Further, with the development of such an autonomous vehicle, the development of a fail operational technique for ensuring the safety of the vehicle in a case where an abnormality or a failure occurs in the in-vehicle system during the autonomous driving has also been advanced.

SUMMARY

The present disclosure provides an electronic control device that acquires at least one of subject vehicle information, surrounding environment information, and road information, detects an abnormality that has occurred in a vehicle during autonomous driving based on a first travel plan, identifying a cause of the abnormality based on at least one of a content of the abnormality, the subject vehicle information, the surrounding environment information, and the road information, determines a situation around the vehicle based on at least one of the subject vehicle information, the surrounding environment information, and the road information, determines a target stop position for stopping the vehicle in a stoppable location based on the cause of the abnormality and the situation around the vehicle, and changes the first travel plan to a second travel plan for stopping the vehicle to the target stop position.

The present disclosure may also be provided as a vehicle control method and a vehicle control program product stored in a computer-readable non-transitory tangible storage medium and including computer-implemented instructions.

BRIEF DESCRIPTION OF DRAWINGS

Objects, features and advantages of the present disclosure will become apparent from the following detailed description made with reference to the accompanying drawings. In the drawings.

DETAILED DESCRIPTION

When a failure occurs in a part of an autonomous driving control system, an autonomous driving may be terminated and switched to a manual driving by a driver in order to secure a safety of the vehicle. Alternatively, when the vehicle cannot be switched to the manual driving, the vehicle may be emergency stopped in an evacuation lane or a traveling lane.

Incidentally, the abnormality that occurs in the in-vehicle system includes not only an abnormality caused by an internal factor such as an initial failure or aging deterioration of a device configuring the in-vehicle system (hereinafter referred to as a spontaneous failure), but also an abnormality caused by an external factor for the vehicle, for example, an abnormality caused by a vehicle being involved in a minor collision or a natural disaster. The present inventors have found that it is desirable to immediately stop the vehicle from the viewpoint of ensuring safety of the vehicle and observance of laws and regulations, and it is desirable to evacuate from the place, depending on the cause of occurrence of an abnormality of the vehicle and a situation around the vehicle at the time of occurrence of the abnormality.

An electronic control device according to an aspect of the present disclosure includes: a travel plan storage configured to store a first travel plan for arriving at a destination by an autonomous driving of a vehicle; an information acquisitor configured to acquire at least one of subject vehicle information related to the vehicle, surrounding environment information related to a surrounding environment of the vehicle, and road information related to a road on which the vehicle travels; an abnormality detector configured to detect an abnormality that has occurred in the vehicle during the autonomous driving based on the first travel plan; a cause identifier connected with the information acquisitor and the abnormality detector, and configured to identify a cause of the abnormality based on at least one of a content of the abnormality, the subject vehicle information, the surrounding environment information, and the road information when the abnormality detector detects the abnormality; a situation determiner connected with the information acquisitor and the abnormality detector and configured to determiner a situation around the vehicle based on at least one of the subject vehicle information, the surrounding environment information, and the road information when the abnormality detector detects the abnormality; and a travel plan changer connected with the travel plan storage, the cause identifier, and the situation determiner, and configured to determine a target stop position for stopping the vehicle in a stoppable location based on the cause of the abnormality and the situation around the vehicle, and to change the first travel plan to a second travel plan for stopping the vehicle to the target stop position.

According to the above-described electronic control device, the vehicle can be appropriately stopped in accordance with the cause of the abnormality that has occurred in the in-vehicle system and the situation around the vehicle at the time of the occurrence of the abnormality.

A vehicle control method according to another aspect of the present disclosure includes: acquiring at least one of subject vehicle information related to a vehicle, surrounding environment information related to a surrounding environment of the vehicle, and road information related to a road on which the vehicle travels; detecting an abnormality that has occurred in an in-vehicle system of the vehicle during an autonomous driving based on a first travel plan stored in a travel plan storage for the vehicle to arrive at a destination; identifying a cause of the abnormality based on at least one of a content of the abnormality, the subject vehicle information, the surrounding environment information, and the road information when detecting the abnormality; determining a situation around the vehicle based on at least one of the subject vehicle information, the surrounding environment information, and the road information when detecting the abnormality; and determining a target stop position for stopping the vehicle in a stoppable location based on the cause of the abnormality and the situation around the vehicle, and changing the first travel plan to a second travel plan for stopping the vehicle to the target stop position.

A vehicle control program product stored in a computer-readable non-transitory tangible storage medium according to another aspect of the present disclosure includes instructions executed by a computer to: acquire at least one of subject vehicle information related to a vehicle, surrounding environment information related to a surrounding environment of the vehicle, and road information related to a road on which the vehicle travels; detect an abnormality that has occurred in an in-vehicle system of the vehicle during an autonomous driving based on a first travel plan stored in a travel plan storage for the vehicle to arrive at a destination; identify a cause of the abnormality based on at least one of a content of the abnormality, the subject vehicle information, the surrounding environment information, and the road information when detecting the abnormality; determine a situation around the vehicle based on at least one of the subject vehicle information, the surrounding environment information, and the road information when detecting the abnormality; and determine a target stop position for stopping the vehicle in a stoppable location based on the cause of the abnormality and the situation around the vehicle, and change the first travel plan to a second travel plan for stopping the vehicle to the target stop position.

According to the above-described vehicle control method and the above-described vehicle control program product, the vehicle can be stopped appropriately in accordance with the cause of the abnormality occurring in the in-vehicle system and the situation around the vehicle at the time of the occurrence of the abnormality.

Hereinafter, a configuration and a function of an electronic control device according to the present disclosure will be described with reference to the drawings.

First Embodiment

1. Configuration of Electronic Control Device 100

Figure 1:
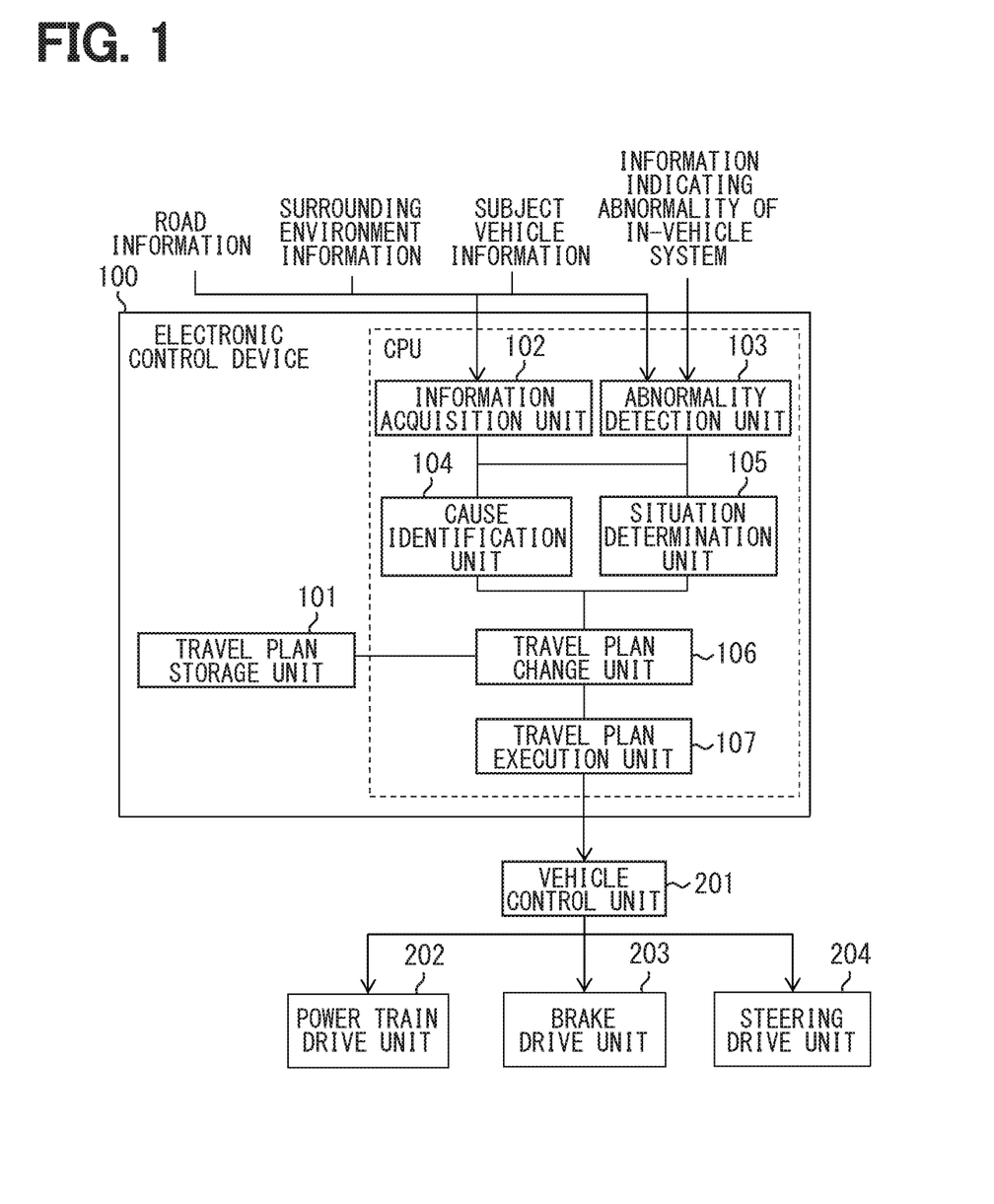
FIG. 1 is a block diagram illustrating a configuration of an in-vehicle system including an electronic control device according to a first embodiment.

FIG. 1 is a block diagram illustrating a configuration of an electronic control device 100 and a device connected to the electronic control device 100 according to a first embodiment. The electronic control device 100 includes a travel plan storage unit 101, an information acquisition unit 102, an abnormality detection unit 103, a cause identification unit 104, a situation determination unit 105, a travel plan change unit 106, and a travel plan execution unit 107.

The electronic control device 100 is connected to a data detection device (not illustrated) for detecting data necessary for driving the vehicle, a vehicle control device for driving the vehicle, and the like through an in-vehicle network. As shown in FIG. 1, the vehicle control device includes, for example, a vehicle control unit 201, a power train drive unit 202 that drives a vehicle based on an instruction from the vehicle control unit 201, a brake drive unit 203, and a steering drive unit 204.

The electronic control device 100 is not limited to the configuration shown in FIG. 1. For example, in the example of FIG. 1, the vehicle control unit 201 is provided separately from the electronic control unit 100, but the electronic control device 100 may include the function of the vehicle control unit 201.

Hereinafter, a configuration of the electronic control device 100 and a device connected to the electronic control device 100 through the in-vehicle network according to the first embodiment will be described with reference to FIG. 1.

The travel plan storage unit 101 stores multiple travel plans for the vehicle to perform an autonomous driving, and the travel plan includes not only a travel plan (corresponding to a "first travel plan" of the present disclosure) for arriving at a destination input through a car navigation system or the like of the vehicle, but also a travel plan for autonomously driving the vehicle when an emergency situation occurs in the vehicle. Those travel plans include, for example, information on a path and a traveling lane on which the vehicle is to travel, and a subject vehicle completes the set travel plan by controlling the subject vehicle in accordance with those pieces of information. The travel plan storage unit 101 corresponds to a travel plan storage.

The information acquisition unit 102 acquires information on the subject vehicle (corresponding to "subject vehicle information" of the present disclosure), information on the "surrounding environment" of the subject vehicle (corresponding to "surrounding environment information" of the present disclosure), and information on a road (corresponding to "road information" of the present disclosure) on which the subject vehicle travels, from the data detection device connected through the in-vehicle network. The information acquisition unit 102 may acquire only a part of those pieces of information, or may further acquire information other than those pieces of information. The information acquisition unit 102 inputs the acquired information to the cause identification unit 104 and the situation determination unit 105. The information acquisition unit 102 corresponds to an information acquisitor.

In this example, the subject vehicle information is information indicating a state of the vehicle, and includes, for example, information such as a temperature, a voltage, and a current of each device configuring the in-vehicle system, as well as speed information, a braking amount, and position information of the vehicle.

The surrounding environment information includes, for example, distance information between the subject vehicle and a surrounding vehicle traveling around the subject vehicle, image information around the subject vehicle, and the like.

The road information includes, for example, map information of a road on which the subject vehicle is traveling, traffic regulations, road shapes, and the like.

The subject vehicle information, the surrounding environment information, and the road information may further include information received from surrounding vehicles, roadside devices, and the like.

In this example, the "surrounding environment information" according to the present disclosure includes not only information such as trouble on a road, but also information on a traveling vehicle existing around the subject vehicle. The "information on a road" includes not only information on a road on which the subject vehicle is traveling but also information accompanying the road. The above information is obtained, for example, by a map database or the like.

The abnormality detection unit 103 "detects" an abnormality which has occurred in the in-vehicle system of the vehicle during the autonomous driving based on the travel plan stored in the travel plan storage unit 101 and which hinders the continuation of the autonomous driving. The abnormality of the in-vehicle system includes the abnormality of the in-vehicle network itself in addition to the abnormality of the devices configuring the in-vehicle system such as the data detection device and the vehicle control device. The abnormality detection unit 103 can detect the occurrence of an abnormality in the in-vehicle system by, for example, receiving a signal indicating that an abnormality has occurred in any device of the in-vehicle system from the in-vehicle network, or detecting that a signal such as the subject vehicle information, the surrounding environment information, the road information, or the like is not normally input from the in-vehicle network. When an abnormality is detected, the abnormality detection unit 103 inputs "the content of the abnormality" to the cause identification unit 104, and inputs a fact that an abnormality has occurred to the situation determination unit 105. The abnormality detection unit 103 corresponds to an abnormality detector.

The "abnormality" in the present disclosure includes not only a failure of the in-vehicle system and the device configuring the in-vehicle system that affects the travel of the vehicle, but also an abnormality of the vehicle which does not affect the travel of the vehicle, for example, a damage or a depression of a vehicle body. In the "detecting" of the present disclosure, in addition to a case where the abnormality detection unit itself directly finds out an abnormality based on various information input to the abnormality detection unit, the abnormality may be found out when information indicating that an abnormality has occurred is input to the abnormality detection unit. In addition, the "content of the abnormality" of the present disclosure includes not only what kind of abnormality has occurred, but also a place where the abnormality has occurred and a time at which the abnormality has occurred.

The cause identification unit 104 identifies the cause of the abnormality occurring in the in-vehicle system based on at least one of the content of the abnormality detected by the abnormality detection unit 103 and the information input from the information acquisition unit 102. In the example of the first embodiment, it is identified whether the cause of the abnormality corresponds to (a) a "minor collision", (b) a "disaster" excluding the minor collision", or (c) a "spontaneous failure" of the in-vehicle system. The cause identification unit 104 corresponds to a cause identifier.

In this example, the "minor collision" in the present disclosure means, for example, a collision accident with another vehicle, a person, a road facility, or the like. The "disaster" in the present disclosure includes natural disasters caused by natural phenomena, for example, earthquakes, lightning strikes, landslide, inundation as well as those caused by artificial factors, for example, a fire. The "spontaneous failure" in the present disclosure refers to an abnormality that occurs due to a reason other than an external factor such as a vehicle accident or disaster, and that occurs in the vehicle system during normal travel of the vehicle.

The situation determination unit 105 determines a situation around the vehicle when an abnormality occurs in the in-vehicle system based on at least one piece of information input from the information acquisition unit 102. The situation determination unit 105 corresponds to a situation determiner.

The situation around the vehicle includes, but is not limited to, a situation in which the vehicle is placed, a situation in the "stop position" of the vehicle, for example, the presence or absence of a space (road shoulder, emergency parking zone) in which the vehicle can stop, the extent of the space, and whether a fire has occurred in the vicinity of the space.

In this example, the "stop position" of the present disclosure includes not only a place where the vehicle is currently stopped but also a stop candidate position where the vehicle may stop if the vehicle is still traveling.

The travel plan change unit 106 "changes" the travel plan set to arrive at a destination to a travel plan for stopping the vehicle (corresponding to a "second travel plan" of the present disclosure) based on the cause of the abnormality identified by the cause identification unit 104 and the situation around the vehicle determined by the situation determination unit 105. In the present embodiment, the travel plan for stopping the vehicle is stored in advance in the travel plan storage unit 101, but may be generated by a travel plan generation unit (not illustrated). The travel plan change unit 106 corresponds to a travel plan changer.

In this example, a term "changing" in the present disclosure includes not only switching the travel plan in execution to a different travel plan, but also changing only a part of the travel plan in execution.

The travel plan execution unit 107 executes the travel plan changed by the travel plan change unit 106. The travel plan executed by the travel plan execution unit 107 will be described later. The travel plan execution unit 107 corresponds to a travel plan executor.

The vehicle control unit 201 outputs a control signal to a vehicle control device such as the power train drive unit 202, the brake drive unit 203, and the steering drive unit 204 based on an instruction from the travel plan execution unit 107. For example, when the travel plan is to stop at the nearest road shoulder, the vehicle control unit 201 outputs a signal for increasing the amount of braking to the brake drive unit 203 and outputs a signal for increasing the steering angle to the steering drive unit 204 based on an instruction from the travel plan execution unit 107.

2. Operation of Electronic Control Device 100

Next, the operation of the electronic control device 100 will be described with reference to a flowchart of FIG. 2. Although not shown in FIG. 2, the information acquisition unit 102 acquires the subject vehicle information, the surrounding environment information, and the road information as appropriate in each step.

In S101, the abnormality detection unit 103 detects an abnormality that gas occurred in the in-vehicle system.

When an abnormality is detected in S101, the cause identification unit 104 identifies the cause of the abnormality in S102. Next, in S103, the situation determination unit 105 determines the situation around the vehicle.

In S104, the travel plan change unit 106 changes the travel plan in which the vehicle performs an autonomous driving to another travel plan stored in the travel plan storage unit 101, based on the cause of the abnormality identified in S102 and the situation around the vehicle determined in S103.

In S105, the travel plan execution unit 107 executes the travel plan changed in S104.

The order of the operation in S102 and S103 is optional.

3. Identification of Cause of Abnormality

Next, a method of identifying the cause of the abnormality in the cause identification unit 104 will be described below for each cause of the abnormality.

(a) A Case where the Cause of the Abnormality is a Minor Collision

An example of a method in which the cause identification unit 104 identifies that the cause of the abnormality of the in-vehicle system is a minor collision will be described below.

When the subject vehicle information includes pressure information of the vehicle body surface indicating that a force equal to or greater than a certain level has been applied to the vehicle body surface by contact of some object, for example, another vehicle, a person or a road facility (hereinafter referred to as a surrounding object), and the time difference between the time at which the force has been applied and the time at which the abnormality detected by the abnormality detection unit 103 has occurred is smaller than a "predetermined value", the cause identification unit 104 identifies that the cause of the abnormality is a contact between the subject vehicle and the surrounding object, that is, a minor collision.

In another example, the subject vehicle information includes sound information indicating a frequency and a sound pressure generated by contact of a surrounding object with the subject vehicle, and when a time difference between a time at which the sound is generated and a time at which the abnormality detected by the abnormality detection unit 103 has occurred is smaller than a predetermined value, the cause identification unit 104 identifies that the abnormality is caused by a contact between the subject vehicle and the surrounding object, that is, by a minor collision.

In this example, the "predetermined value" in the present disclosure may be a value uniquely determined when a condition is given, and need not be a constant value at all times. In addition, the term "than" in the present disclosure includes both the case of including the same value as the comparison object and the case of not including the same value.

In another example, the surrounding environment information includes image information indicating that the subject vehicle and the surrounding object have contacted with each other, and when a time difference between a time at which an image has been captured and a time at which the abnormality detected by the abnormality detection unit 103 has occurred is smaller than a predetermined value, the cause identification unit 104 identifies that the cause of the abnormality is a contact between the subject vehicle and the surrounding object, that is, a minor collision.

In another example, the surrounding environment information includes the accident occurrence information received from another vehicle, and when the time difference between the occurrence time of the accident and the time at which the abnormality detected by the abnormality detection unit 103 has occurred is smaller than a predetermined value, the cause identification unit 104 identifies that the cause of the abnormality is a contact between the subject vehicle and the surrounding object, that is, a minor collision.

In another example, when the shape of the subject vehicle indicated by the image information included in the surrounding environment information changes before and after the occurrence time of the abnormality detected by the abnormality detection unit 103, the cause identification unit 104 identifies that the cause of the abnormality is a contact between the subject vehicle and the surrounding object, that is, a minor collision.

In the above example, the cause identification unit 104 detects that the subject vehicle collides with the surrounding object based on the subject vehicle information and/or the surrounding environment information. However, when the in-vehicle system includes a vehicle collision detection device (not illustrated) that detects a collision between the subject vehicle and a surrounding object, the cause identification unit 104 may identify that the abnormality is caused by a minor collision based on the collision information between the subject vehicle and the surrounding object input from the vehicle collision detection device.

(b) A Case where the Cause of the Abnormality is a Disaster

Next, an example of a method in which the cause identification unit 104 identifies that the cause of the abnormality of the in-vehicle system is a disaster will be described below. In the first embodiment, a method of identifying an earthquake, a lightning strike, a fire, a sediment disaster, and a flood among various types of disasters will be described. However, the cause identification unit 104 may identify a disaster other than the above. Sediment disasters include those caused by falling stones or falling beds, and the flood includes a disaster caused by tsunami, inundation, and submerging.

When the surrounding environment information includes an emergency earthquake warning received from a disaster prevention radio, and a time difference between a time of occurrence of the earthquake and a time of occurrence of the abnormality detected by the abnormality detection unit 103 is smaller than a predetermined value, the cause identification unit 104 identifies that the abnormality is caused by the earthquake. Similarly, the cause identification unit 104 identifies that the cause of the abnormality is a lightning strike when the surrounding environment information includes lightning strike information for the vicinity of the current location of the subject vehicle, that the cause of the abnormality is a fire when fire information for the vicinity of the current location of the subject vehicle is included, that the cause of the abnormality is a sediment disaster when the sediment disaster information for the vicinity of the current location of the subject vehicle is included, and that the cause of the abnormality is a flood when the flood information for the vicinity of the current location of the subject vehicle is included.

Even when the surrounding environment information includes the emergency earthquake warning, the cause identification unit 104 may identify that the cause of the abnormality is a sediment-related disaster when it can be determined that the subject vehicle is within a sediment disaster risk area based on the position information and the map information of the subject vehicle.

In another example, when the subject vehicle information includes vibration information indicating abnormal vibration of a device configuring the in-vehicle system, the cause identification unit 104 identifies that the cause of the abnormality is an earthquake.

When voltage or current information of the device configuring the in-vehicle system included in the subject vehicle information indicates an abnormal voltage or current value generated by the lightning strike, the cause identification unit 104 identifies that the cause of the abnormality is the lightning strike.

When the surrounding environment information includes image information indicating the occurrence of a fire, outside air temperature information indicating an abnormal high temperature, or smoke sensing information indicating the occurrence of smoke, the cause identification unit 104 identifies that the cause of the abnormality is a fire that has occurred outside the vehicle.

When the surrounding environment information includes image information indicating a landslide or information detected by a millimeter wave radar or a lidar, the cause identification unit 104 identifies that the cause of the abnormality is a sediment disaster.

When the surrounding environment information includes information indicating an intrusion of water into the device configuring the in-vehicle system, which is detected by a water detection sensor, the cause identification unit 104 identifies that the cause of the abnormality is a flood.

(c) A Case where the Cause of the Abnormality is a Spontaneous Failure

When the cause of the abnormality does not correspond to (a) a minor collision or (b) a disaster, the cause identification unit 104 identifies that the cause of the abnormality is a spontaneous failure of the vehicle system.

4. Specific Example of Travel Plan

Next, a specific example of the travel plan executed by the travel plan execution unit 107 for each cause of the abnormality will be described.

(a) A Case where the Cause of the Abnormality is a Minor Collision

In a case where a minor collision has occurred, it is desirable to immediately stop the vehicle in the vicinity of an accident site and contact a police from the viewpoint of legal compliance. However, the safety of the vehicle may not be ensured if the vehicle is stopped in the vicinity of the accident site depending on the situation around the vehicle. Therefore, the travel plan change unit 106 changes the travel plan based on the situation around the vehicle in the vicinity of the accident site determined by the situation determination unit 105.

Figure 2:
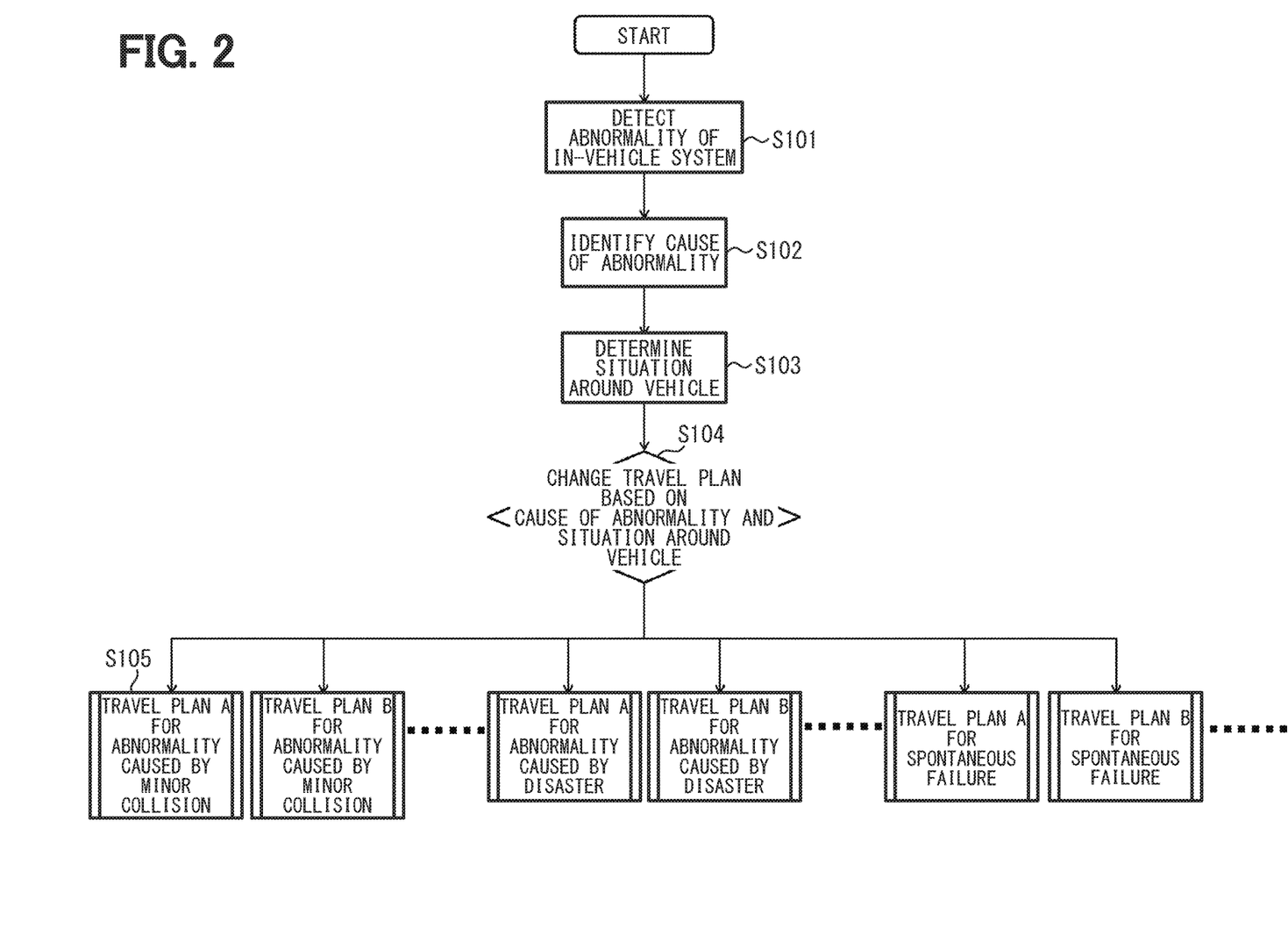
FIG. 2 is a flowchart illustrating an operation of the electronic control device according to the first embodiment.
Figure 3:
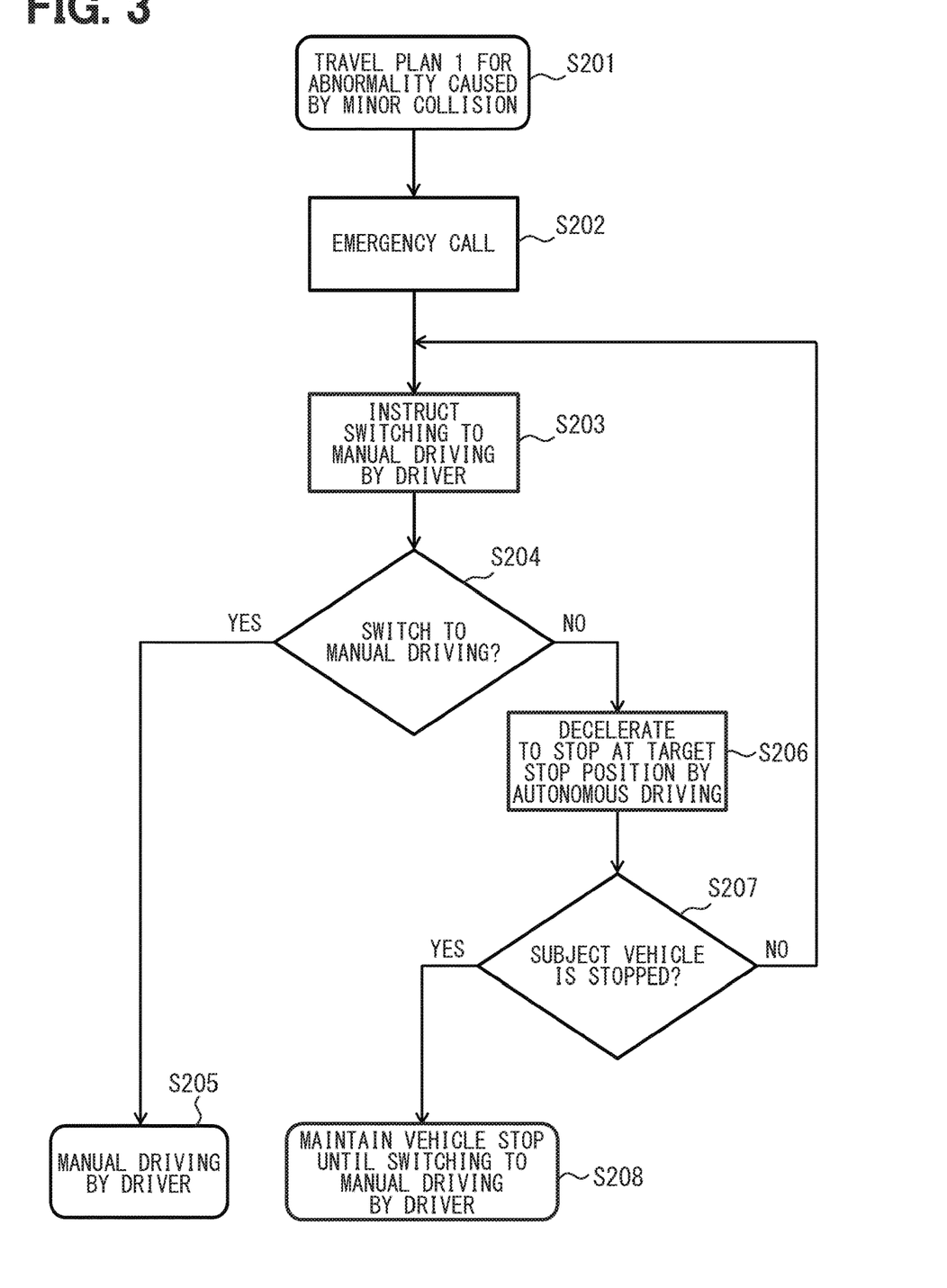
FIG. 3 is a flowchart illustrating a travel plan in the case where the cause of an abnormality is a minor collision in the first embodiment.

FIG. 3 shows a flowchart of a travel plan 1 executed by the travel plan execution unit 107 when a minor collision occurs. If it is determined in S104 of FIG. 2 that the cause of the abnormality is a minor collision, the process after S201 is started.

In S202, the vehicle makes an emergency call to the police. The emergency call is transmitted through a transmission unit (not illustrated) of the electronic control device 100.

In S203, the transmission unit of the electronic control device 100 outputs a signal that instructs switching to the manual driving to a notification unit of a car navigation system or the like.

In S204, the travel plan execution unit 107 determines whether the driving has been switched from the autonomous driving to the manual driving. If it is determined that the driving has been switched to the manual driving, the manual driving by the driver is continued (S205). On the other hand, when the driving is not switched to the manual driving, in S206, the vehicle control unit 201 outputs a control signal to the brake drive unit 203 based on instructions from the travel plan execution unit 107, and decelerates the vehicle to stop the vehicle at the target stop position.

Next, in S207, the travel plan execution unit 107 determines whether the subject vehicle is stopped, and when the travel plan execution unit 107 determines that the vehicle is not stopped, the travel plan execution unit 107 outputs a signal that instructs switching to manual driving again. On the other hand, when the travel plan execution unit 107 determines that the subject vehicle is stopped, the travel plan execution unit 107 maintains the vehicle in a stopped state until the driving is switched to the manual driving by the driver (S208).

The target stop position in S206 of FIG. 3 is set to a place where the vehicle can stop safely in the vicinity of the accidental site based on the situation around the vehicle determined by the situation determination unit 105. In addition to determining whether the vehicle can be stopped safely, the situation determination unit 105 may determine a width of a road shoulder, for example, when the target stop position is set to the road shoulder. When the situation determination unit 105 determines that the road shoulder of the road set as the target stop position is wide, the travel plan change unit 106 changes the target stop position to a place close to a road shoulder edge portion in the vicinity of the accident site.

The situation determination unit 105 may further determine the traveling location of the subject vehicle as a situation around the subject vehicle. For example, when the situation determination unit 105 determines that the traveling location of the subject vehicle is within the tunnel, the target stop position is changed to an emergency parking zone of the tunnel in the vicinity of the accident site. When the situation determination unit 105 determines that the traveling location of the subject vehicle is within the tunnel and that a fire has occurred within the tunnel as the situation around the subject vehicle, the target stop position is changed to the road shoulder of the road outside the tunnel. Even when it is determined that a fire has occurred in the tunnel, when an instruction at the time of occurrence of a fire is displayed on an alarm display board in the tunnel, the target stop position may be changed based on the instruction. As another example, when the situation determination unit 105 determines that the traveling location of the subject vehicle is a lane reduction section, the target stop position may be changed to an end of the lane.

The situation determination unit 105 may further determine the degree of congestion of the traveling location of the subject vehicle as a situation around the subject vehicle. For example, when the subject vehicle is traveling in a congested section, even if the road shoulder or the emergency parking zone is set as the target stop position, the subject vehicle may stop due to traffic congestion before arriving at the set target parking position. Therefore, when the situation determination unit 105 determines that the subject vehicle is traveling in the congested section, the travel plan change unit 106 may change the travel plan to a travel plan in which the target stop position is set to a road shoulder or an emergency parking zone in the vicinity of the current location of the vehicle, and when the subject vehicle follows the preceding vehicle and the subject vehicle stops in front of the target stop position due to traffic congestion, the vehicle is maintained in the stopped state until the driving is switched to the manual driving by the driver.

Then, the travel plan execution unit 107 outputs a control signal to the vehicle control unit 201 so that the vehicle stops at the target stop position changed by the travel plan change unit 106.

In the first embodiment, the travel plan change unit 106 sets, as the target stop position, a location where the vehicle can stop safely based on the situation around the vehicle determined by the situation determination unit 105. However, in a case where another vehicle has stopped at the set target stop position first while approaching the target stop position, or in a case where the situation determination unit 105 determines that the target stop position is not safe after approaching the target stop position, the travel plan change unit 106 may change the target stop position again. In that case, the travel plan execution unit 107 outputs a signal to the vehicle control unit 201 so that the vehicle moves to a new target stop position and stops.

According to the travel plan 1 shown in FIG. 3, since the vehicle can be stopped at a safe place in the vicinity of the accident site by the autonomous driving, the safety of the vehicle can be secured and the travel plan in compliance with laws and regulations can be executed.

In the travel plan 1 shown in FIG. 3, the driving is instructed to switch to the manual driving in S203, and the vehicle is stopped in the vicinity of the accident site by the autonomous driving only when the driving is not switched to the manual driving. However, if switching from the autonomous driving to the manual driving is enabled when a minor collision occurs, for example, the driver of the vehicle may erroneously determine the cause of the occurrence of the abnormality as a mere spontaneous failure and may be separated from the accident site.

Therefore, in a travel plan 2 shown in FIG. 4 to be described below, the vehicle is stopped in the vicinity of the accident site by the autonomous driving without instructing the switching to the manual driving.

If it is determined in S104 of FIG. 2 that the cause of the abnormality is a minor collision, the process after S301 is started.

In S302, as in S202 of FIG. 3, the vehicle makes an emergency call.

In S303, the vehicle control unit 201 outputs a control signal to the brake drive unit 203 based on an instruction from the travel plan execution unit 107, and decelerates the vehicle in order to stop the vehicle at the target stop position.

In S304, the travel plan execution unit 107 determines whether the subject vehicle is stopped, and when it is determined that the vehicle is stopped, the vehicle is maintained in a stopped state until the driving is switched to the manual driving by the driver (S305).

Figure 4:
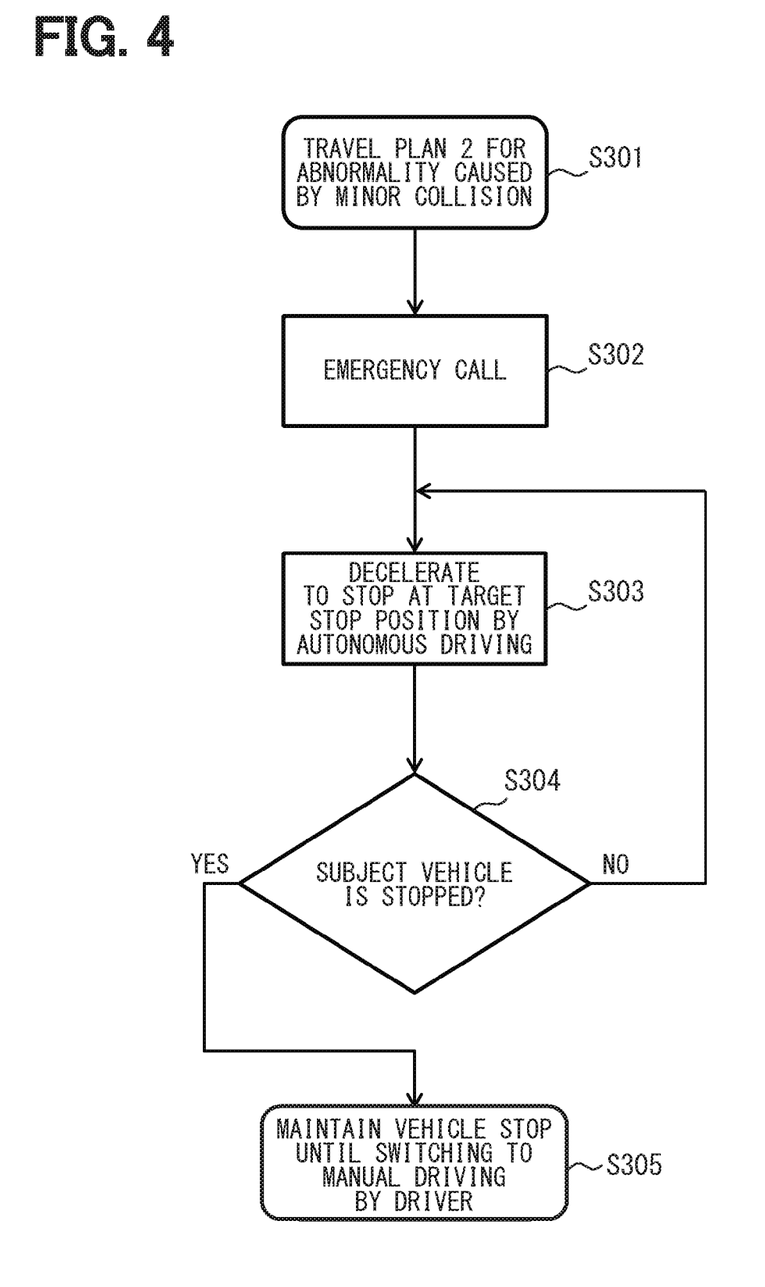
FIG. 4 is a flowchart illustrating another travel plan in the case where the cause of the abnormality is a minor collision in the first embodiment.

According to the travel plan 2 shown in FIG. 4, the vehicle can be reliably stopped in the vicinity of the accident site.

(b) A Case where the Cause of the Abnormality is a Disaster

It may be desirable to stop the vehicle in the vicinity of the site or to evacuate the vehicle to a safe location to prevent further damage depending on the type of disaster. Therefore, the travel plan change unit 106 changes the travel plan in accordance with the disaster identified by the cause identification unit 104.

A desired travel plan in a case where an abnormality in the in-vehicle system has occurred due to an earthquake or a lightning strike among the disasters is substantially the same as the travel plan shown in FIG. 3, except that the emergency call is made (S202). In other words, in S104 of FIG. 2, if it is determined that the cause of the abnormality is an earthquake or a lightning strike, the travel plan execution unit 107 starts the processes of S203 and the subsequent steps in FIG. 3, and instructs the switching to the manual driving (S203). When the driving is not switched to the manual driving, the vehicle is stopped at the target stop position such as the road shoulder or the emergency parking zone by the autonomous driving (S206 and S207), and the vehicle is maintained in the stopped state until the driving is switched to the manual driving (S208).

When an earthquake occurs, a shake often increases over time. In addition, it is difficult to control the vehicle, in particular, the vehicle in which the abnormality occurs and to continue the appropriate autonomous driving under a shaking state. In addition, when an abnormality occurs in the vehicle due to the lightning strike, there is a high possibility that an abnormality occurs in an electric system or a control system of the vehicle, and there is a high possibility that the safety of the vehicle can be ensured more when the vehicle is stopped at the current location and waits for a lightning cloud to pass the vehicle than when the vehicle is moved. Therefore, when an abnormality occurs in the vehicle due to an earthquake or a lightning strike, the vehicle is stopped in the vicinity of the location.

Figure 5:
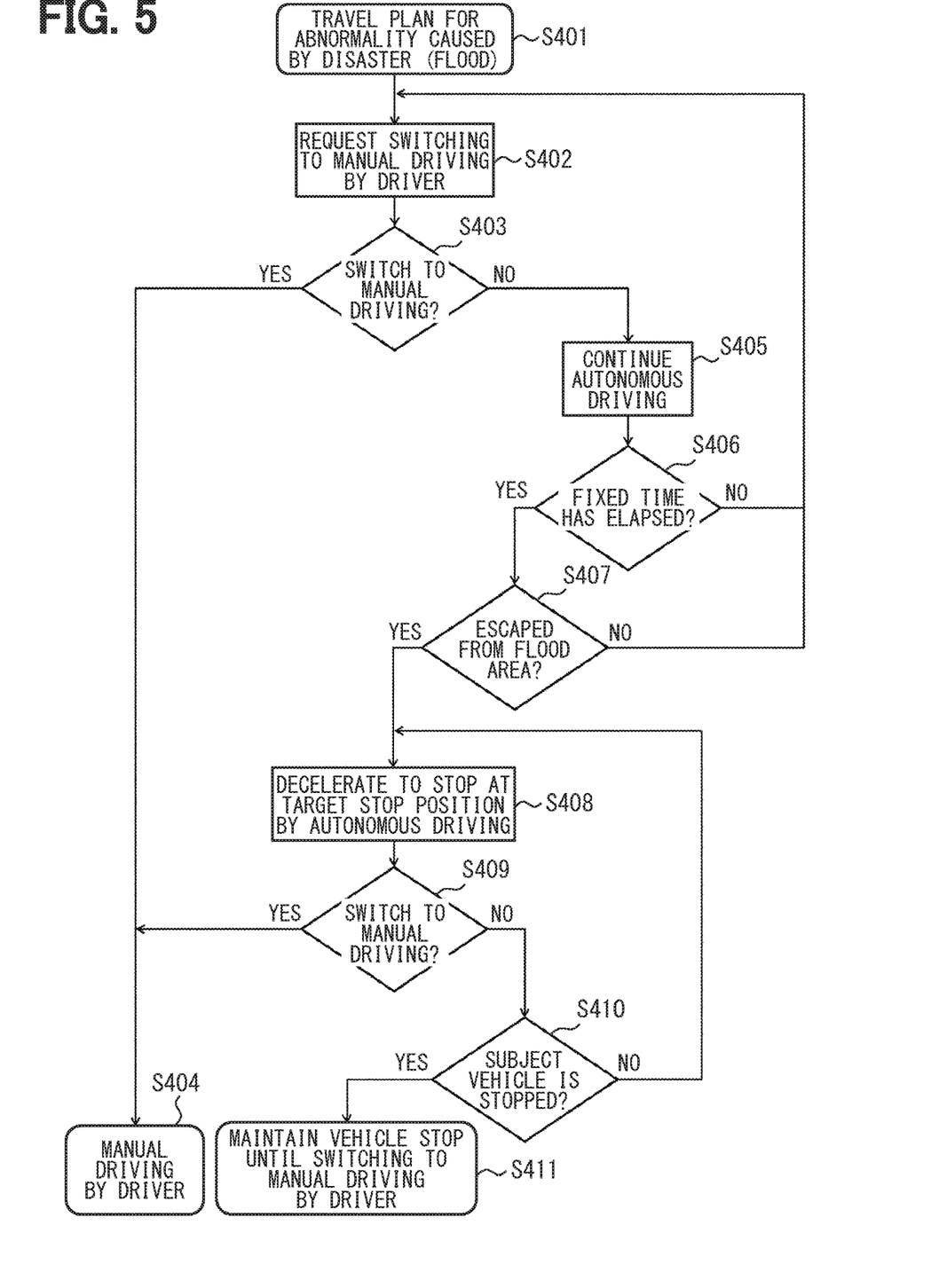
FIG. 5 is a flowchart illustrating a travel plan in the case where the cause of an abnormality is a flood among disasters in the first embodiment.

On the other hand, FIG. 5 shows a flowchart of a travel plan executed by the travel plan execution unit 107 when an abnormality occurs in the in-vehicle system due to a flood among disasters. If it is identified in S104 of FIG. 2 that the cause of the abnormality is a flood, the travel plan execution unit 107 starts the processes of S401 and the subsequent steps.

In S402, the transmission unit of the electronic control device 100 outputs a signal instructing the driving to switch to the manual driving to the notification unit.

In S403, the travel plan execution unit 107 determines whether the driving has been switched from the autonomous driving to the manual driving. In this example, when the driving is switched to the manual driving, the manual driving by the driver is continued (S404). On the other hand, when the driving is not switched to the manual driving, the autonomous driving is continued in S405. While the autonomous driving is continued, a signal instructing the driver to switch to the manual driving is output until a predetermined time elapses.

When a predetermined period of time has elapsed (S406), in S407, the travel plan execution unit 107 determines whether the subject vehicle has escaped from a flood area. If it is determined that the subject vehicle has not escaped, a signal for instructing switching to the manual driving is output again. On the other hand, when it is determined that the subject vehicle has escaped from the flood area, the vehicle control unit 201 outputs a control signal to the brake drive unit 203 based on an instruction from the travel plan execution unit 107 in S408, and decelerates the vehicle to stop the vehicle at the target stop position.

In S409, the travel plan execution unit 107 determines whether the driving has been switched from the autonomous driving to the manual driving. If the vehicle has not yet been switched to the manual driving at that stage, the deceleration of the vehicle is continued.

Then, in S410, the travel plan execution unit 107 determines whether the subject vehicle has been completely stopped. When it is determined that the vehicle has not been stopped, the deceleration of the vehicle is continued, and when it is determined that the vehicle has been stopped, the vehicle is maintained in the stopped state until the driving is switched to the manual driving by the driver (S411).

A case where the cause of the abnormality of the in-vehicle system is a disaster caused by a flood has been described with reference to FIG. 5. However, also in a case where the cause of the abnormality is other than the flood, for example, in a case of a fire or a sediment disaster, the travel plan execution unit 107 executes a travel plan similar to that of FIG. 5.

With the execution of the travel plan as shown in FIG. 5 when an abnormality occurs due to a flood, a fire, or a sediment disaster, the vehicle escapes from the disaster site, thereby being capable of avoiding further damage to the vehicle and ensuring the safety of the vehicle and the occupant.

(c) A Case where the Cause of the Abnormality is a Spontaneous Failure of the in-Vehicle System When an abnormality occurs in the in-vehicle system due to a spontaneous failure, unlike when an abnormality occurs due to a minor collision or a disaster, the necessity for the vehicle to stay at the site and to evacuate urgently from the site is low. Therefore, when the cause of the abnormality is a spontaneous failure, a travel plan for stopping the vehicle at a safer place is executed.

A desired travel plan in a case where an abnormality has occurred due to a spontaneous failure is substantially equivalent to the travel plan shown in FIG. 3, except that an emergency call is made (S202). In other words, if it is determined in S104 of FIG. 1 that the cause of the abnormality is a spontaneous failure, the travel plan execution unit 107 starts the process of S203 in FIG. 3 and thereafter, and instructs the switching to the manual driving (S203). When the vehicle is not switched to the manual driving (S204), the vehicle is stopped at a target stop position such as a road shoulder or an emergency parking zone by the autonomous driving (S206 and S207), and the vehicle is maintained in the stopped state until the driving is switched to the manual driving (S208).

(d) A Case where Multiple Abnormalities Occur

FIGS. 3 to 5 illustrate the processing from the start of the travel plan in the case where the cause of the abnormality is a minor collision, a disaster, and a spontaneous failure, to the end of the travel plan by stopping the vehicle or switching to the manual driving. However, during the execution of the travel plan shown in FIGS. 3 to 5, a new abnormality may occur due to a factor different from the first cause of occurrence of the abnormality.

Therefore, when a new abnormality (hereinafter, referred to as a second abnormality) occurs during the execution of the travel plan changed in association with the occurrence of an abnormality (hereinafter referred to as a first abnormality) of the in-vehicle system, the travel plan is changed based on the cause of the newly occurring second abnormality and the situation around the vehicle by performing the processes in S101 and the subsequent steps in FIG. 2.

As another example, even when the second abnormality occurs during execution of the travel plan changed in association with the occurrence of the first abnormality, the vehicle may change the travel plan based on the cause of the first abnormality and the situation around the vehicle at the time of the occurrence of the first abnormality. For example, in a case where the cause of the first abnormality is a flood and the cause of the second abnormality is a spontaneous failure, if the travel plan based on the cause of the second abnormality is executed, there is a possibility that the subject vehicle is stopped before escaping from the flood area. Therefore, it is desirable to execute the travel plan based on the cause of the first abnormality.

Therefore, the priority order may be set for each cause of the abnormality in advance, and when an abnormality caused by a different event occurs multiple times, the travel plan change unit 106 may change the travel plan based on the set priority order. In this example, the priority order set for each cause of abnormality is arbitrary, but the priority order may be set, for example, from the viewpoint of vehicle safety and legal compliance.

(Modification 1)

According to the first embodiment, the travel plan change unit 106 changes the travel plan for performing the autonomous driving based on the cause of occurrence of the abnormality identified by the cause identification unit 104 and the situation around the vehicle determined by the situation determination unit 105. However, the electronic control device 100 may change the travel plan based on the setting of "the user of the vehicle" in addition to the cause of occurrence of the abnormality and the situation around the vehicle.

For example, the user of the vehicle may set in advance which of a stoppable position closest to the current position and a stoppable position with higher safety is set as a target stop position, when an abnormality occurs in the in-vehicle system.

For example, when an abnormality occurs in the in-vehicle system on a general road and the user sets a stoppable position closest to the current position as the target stop position, the travel plan change unit 106 changes the target stop position to a nearby road shoulder. On the other hand, when the user sets the stoppable position with higher safety as the target stop position, the travel plan change unit 106 sets an emergency parking zone as the target stop position.

In another example, when an abnormality occurs in the in-vehicle system in a tunnel, and the user sets the stoppable position closest to the current position as the target stop position, the travel plan change unit 106 changes the target stop position to the emergency parking zone in the tunnel. On the other hand, when the user sets the stoppable position with higher safety as the target stop position, the travel plan change unit 106 sets a road shoulder outside the tunnel as the target stop position.

The "user of the vehicle" in the present disclosure includes a dealer or a manufacturer as well as an owner or a driver of the vehicle.

(Modification 2)

According to the first embodiment, the situation determination unit 105 determines the situation around the subject vehicle. However, the situation determination unit 105 may also determine the situation of the subject vehicle itself in addition to the situation around the subject vehicle.

For example, when an abnormality occurs in the in-vehicle system, the situation determination unit 105 may determine whether the subject vehicle is subjected to smoking or firing as the situation of the subject vehicle. When the situation determination unit 105 determines that the subject vehicle is smoking or firing, the travel plan change unit 106 changes the target stop position to the nearest road shoulder or the emergency parking zone, and the travel plan execution unit 107 performs the processing of S203 and the subsequent steps of FIG. 3.

It should be noted that, for example, when the temperature information included in the subject vehicle information indicates that the temperature of the device configuring the in-vehicle system is an abnormal high temperature, when smoke sensing information indicates that smoke is generated from an inside of the subject vehicle, when image information indicates an image of smoke or flame generated from the subject vehicle, or when the information received from the surrounding vehicle includes information on smoking or firing of the subject vehicle, the situation determination unit 105 can determine that the subject vehicle is smoking or firing.

Figure 6:
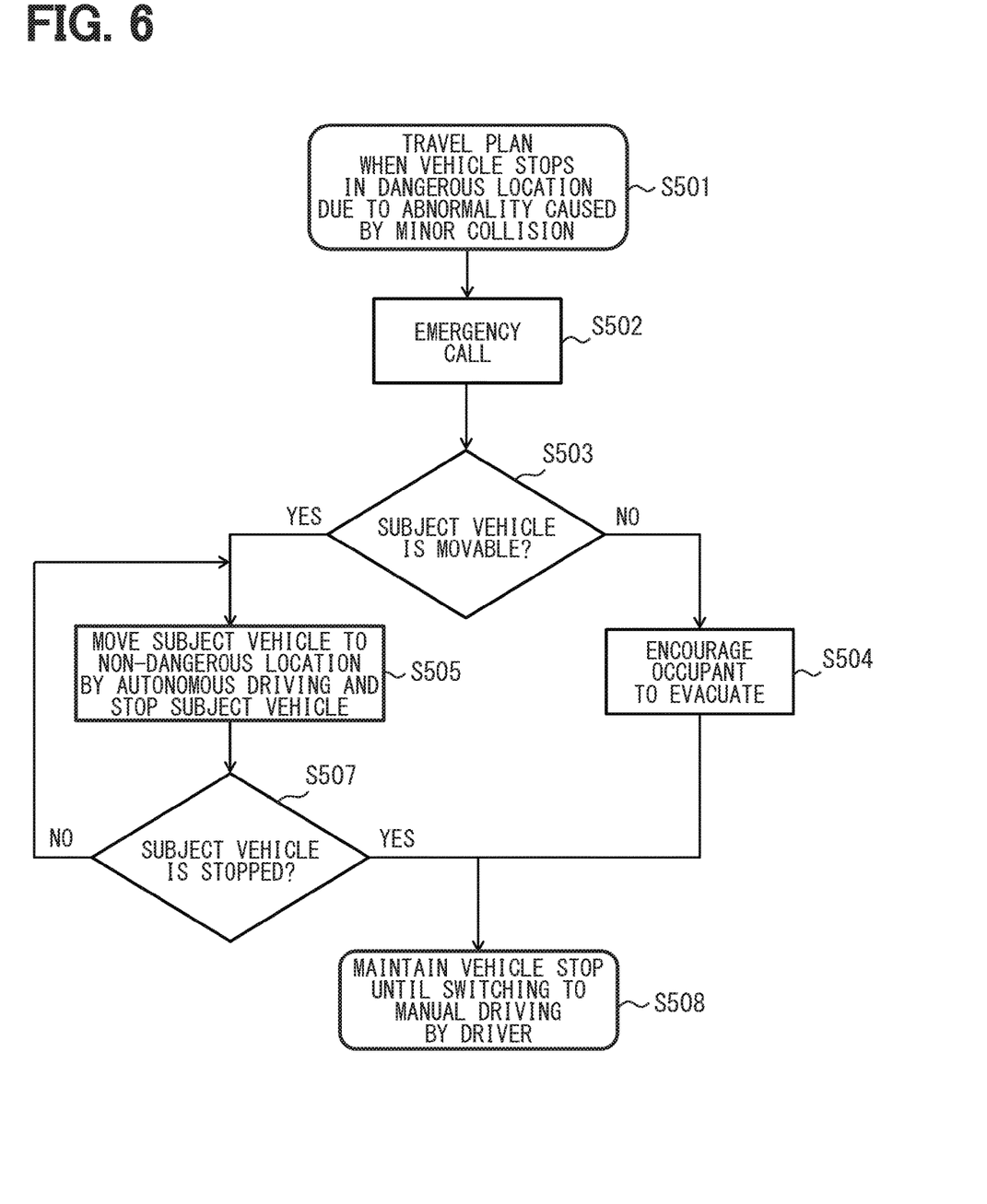
FIG. 6 is a flowchart illustrating a travel plan in a modification 2 of the first embodiment.

When an abnormality occurs in the in-vehicle system, the situation determination unit 105 may further determine whether the subject vehicle is stopped due to the abnormality as a situation of the subject vehicle, and if the subject vehicle is stopped, the situation determination unit 105 may determine whether the stopped location is dangerous for continuing the vehicle stop. FIG. 6 shows an example of a travel plan to be executed by the travel plan execution unit

107 when the cause identification unit 104 identifies that the cause of the abnormality is a minor collision and the situation determination unit 105 determines that the subject vehicle is stopped at a dangerous place.

First, in S502, the vehicle makes an emergency call to a police.

Next, in S503, the travel plan execution unit 107 determines whether the subject vehicle is movable. In this example, when it is determined that the vehicle cannot be restarted and cannot be moved due to the abnormal of the in-vehicle system, the travel plan execution unit 107 prompts an occupant of the vehicle to evacuate from the vehicle in S504.

On the other hand, when it is determined that the subject vehicle is movable, the travel plan execution unit 107 restarts the vehicle and moves the vehicle to a safe location by the autonomous driving in S505.

If it is determined in S507 that the subject vehicle has stopped, the travel plan execution unit 107 keeps the vehicle stopped until the driving is switched to the manual driving by the driver.

The situation determination unit 105 can determine that the stop position is dangerous, for example, when the image information indicates that the subject vehicle is stopped across a lane, indicates that a fire has occurred in the vicinity of the stop position of the subject vehicle, indicates that the subject vehicle is stopped in a posture in which a hazard flasher of the subject vehicle is not visible from the following vehicle, or when map information and the vehicle position information indicate that the subject vehicle is stopped in a place with poor visibility.

Whether or not the subject vehicle is movable (S503) is determined based on, for example, whether to enable a function related to traveling, stopping, and steering of the vehicle, and a function of monitoring the subject vehicle and the surrounding environment by the vehicle, even if abnormality has occurred in the in-vehicle system. For example, the travel plan change unit 106 may determine that the subject vehicle is movable when all of those functions are enabled. However, whether the subject vehicle is movable may be determined according to any information.

Second Embodiment

In the first embodiment, when an abnormality occurs in the in-vehicle system due to a minor collision or the like, the travel plan is changed based on the cause of the occurrence of the abnormality and the situation around the vehicle. However, it is desirable from the viewpoint of legal compliance to stop the vehicle in the vicinity of an accident site regardless of whether an abnormality has occurred in the in-vehicle system when the vehicle has experienced a minor collision.

Therefore, according to a second embodiment, even when an abnormality detection unit 103 does not detect the abnormality of an in-vehicle system, the abnormality detection unit 103 detects a damage of the vehicle which does not accompany the abnormality of the in-vehicle system, such as a depression of a vehicle body, as the abnormality of the vehicle. Further, when a cause identification unit 104 detects the occurrence of a minor collision, a travel plan set to arrive at a destination is changed to another travel plan.

The abnormality detection unit 103 according to the second embodiment detects an abnormality such as a vehicle body damage based on information acquired by information acquisition unit 102. In addition, the cause identification unit 104 detects, based on the information acquired by the information acquisition unit 102, that the subject vehicle has come into contact with a surrounding object and a minor collision has occurred.

When the cause identification unit 104 detects that the subject vehicle comes into contact with the surrounding object and a minor collision occurs, a travel plan change unit 106 changes the travel plan based on a situation around the vehicle determined by the situation determination unit 104. The travel plan may be a travel plan shown in FIG. 3 or FIG. 4 referred to in the first embodiment.

According to the second embodiment, even when no abnormality occurs in the in-vehicle system, the vehicle can be stopped in the vicinity of an accident site when a minor collision of the vehicle occurs.

The features of the electronic control device according to each embodiment of the present disclosure have been described above.

The configurations of the respective embodiments have been described with reference to the block diagrams and the methods of those embodiments have been described with reference to the flowcharts. In addition, the above methods can be realized not only by the above-described manners, but also by a program recorded in a storage medium such as a memory or a hard disk, and a combination with a microcomputer having a dedicated or general-purpose CPU and a memory for executing the program. The program can also be provided from a server through a communication line without using a recording medium. This allows the latest functions to be provided at all times through program upgrades.

The flowcharts or the processes of the flowcharts described in the present disclosure are configured by multiple units (or steps), and each unit is represented by, for example, S101. Furthermore, each unit may be divided into multiple sub-units, while multiple units may be combined into one unit. In addition, each unit configured in this manner may be referred to as a circuit, a device, a module, or a means.

Also, each or a combination of the multiple units may be implemented as (i) a unit of software in combination with a hardware unit (for example, a computer), as well as (ii) a unit of hardware (for example, an integrated circuit, a wired logic circuit), with or without the functionality of the associated device. Further, the hardware unit can be configured inside the microcomputer.

Although the electronic control device according to the present disclosure is mainly used for controlling the travel of an automobile, the electronic control device may be used for controlling the travel of a vehicle other than the automobile, for example, a motorcycle, an electrically assisted bicycle, or the like. Moreover, the present disclosure is not limited to those applications. The present disclosure may also be provided as a vehicle control method and a vehicle control program product including computer-implemented instructions, and stored on computer-readable non-transitory tangible storage medium.

Although the present disclosure has been described in accordance with the examples, it is understood that the present disclosure is not limited to such examples or structures. The present disclosure encompasses various modifications and variations within the scope of equivalents. In addition, various combinations and configurations, as well as other combinations and configurations that include only one element, more, or less, fall within the scope and spirit of the present disclosure.

What is claimed is:

1. An electronic control device comprising:
a travel plan storage configured to store a first travel plan for arriving at a destination by autonomous driving of a vehicle;
an information acquisitor configured to acquire at least one of subject vehicle information related to the vehicle, surrounding environment information related to a surrounding environment of the vehicle, and road information related to a road on which the vehicle travels;
an abnormality detector configured to detect an abnormality that has occurred in an in-vehicle system of the vehicle during autonomous driving based on the first travel plan;
a cause identifier connected with the information acquisitor and the abnormality detector, and configured to identify whether a cause of the abnormality is one of a) a minor collision, b) a disaster excluding the minor collision, or c) a spontaneous failure of the in-vehicle system based on at least one of a content of the abnormality, the subject vehicle information, the surrounding environment information, and the road information when the abnormality detector detects the abnormality;
a situation determiner connected with the information acquisitor and the abnormality detector, and configured to determine a situation around the vehicle based on at least one of the subject vehicle information, the surrounding environment information, and the road information when the abnormality detector detects the abnormality;
a travel plan changer connected with the travel plan storage, the cause identifier, and the situation determiner, and configured to determine a target stop position for stopping the vehicle in a stoppable location based on the cause of the abnormality and the situation around the vehicle, and to change the first travel plan to a second travel plan for stopping the vehicle to the target stop position; and
a travel plan executor configured to execute the second travel plan and to output a control signal to a vehicle controller configured to control the vehicle so that the vehicle stops at the target stop position changed by the travel plan changer, wherein
when the cause of the abnormality is the disaster excluding the minor collision, the travel plan changer determines a vicinity of the vehicle or a place spaced from a periphery of the vehicle as the target stop position based on a type of the disaster, and
when the cause of the abnormality is any one of a flood, a fire, and a sediment disaster in the disaster excluding the minor collision, a safe place spaced from the periphery of the vehicle is defined as the target stop position.

2. The electronic control device according to claim 1, wherein
when the cause of the abnormality is an earthquake or a lightning strike in the disaster excluding the minor collision, the vicinity of the vehicle is defined as the target stop position.

3. The electronic control device according to claim 1, wherein
the travel plan changer changes the first travel plan based on a setting by a user of the vehicle in addition to the cause of the abnormality and the situation around the vehicle.

4. The electronic control device according to claim 1, wherein
the situation determiner further determines a situation of the vehicle.

5. The electronic control device according to claim 1, wherein
the situation around the vehicle includes a situation of a stop position of the vehicle.

6. The electronic control device according to claim 1, wherein
the cause identifier identifies that the cause of the abnormality is the minor collision when a time difference between a time at which the subject vehicle information or the surrounding environment information indicates that the vehicle has come into contact with an object and a time at which the abnormality has occurred is smaller than a predetermined value.

7. The electronic control device according to claim 1, wherein
when the situation around the vehicle is not safe, a safe place spaced from the periphery of the vehicle is defined as the target stop position.

8. The electronic control device according to claim 1, wherein
when the cause of the abnormality is the spontaneous failure of the in-vehicle system, a place where the vehicle is capable of stopping safely is defined as the target stop position.

9. The electronic control device according to claim 8, wherein
the place where the vehicle is capable of stopping safely includes a road shoulder or an emergency parking zone.

10. The electronic control device according to claim 1, wherein
when one of the minor collision, the disaster excluding the minor collision, and the spontaneous failure of the in-vehicle system is defined as a first abnormality and an abnormality different from the first abnormality is defined as a second abnormality, and
when the cause identifier identifies that the second abnormality has occurred during execution of the second travel plan for the first abnormality started with an occurrence of the first abnormality, the travel plan changer changes from the second travel plan for the first abnormality to the second travel plan for the second abnormality based on the cause of the second abnormality and the situation around the vehicle.

11. The electronic control device according to claim 1, wherein
when one of the minor collision, the disaster excluding the minor collision, and the spontaneous failure of the in-vehicle system is defined as a first abnormality and an abnormality different from the first abnormality is defined as a second abnormality, and
when the cause identifier identifies that the second abnormality has occurred during execution of the second travel plan for the first abnormality started with an occurrence of the first abnormality, the travel plan changer maintains the second travel plan for the first abnormality based on the cause of the first abnormality and the situation around the vehicle.

12. The electronic control device according to claim 1, wherein
the situation around the vehicle includes presence or absence of a space in which the vehicle is stoppable, an extent of the space, and a situation in a vicinity of the space.

13. The electronic control device according to claim 1, wherein
the information acquisitor, the abnormality detector, the situation determiner, and the travel plan changer are realized by a processor when executing a program stored in a storage medium or provided from a server through a communication line.

14. A vehicle control program product stored in a computer-readable non-transitory tangible storage medium, comprising instructions executed by a computer to:
acquire at least one of subject vehicle information related to a vehicle, surrounding environment information related to a surrounding environment of the vehicle, and road information related to a road on which the vehicle travels;
detect an abnormality that has occurred in an in-vehicle system of the vehicle during autonomous driving based on a first travel plan stored in a travel plan storage for the vehicle to arrive at a destination;
identify whether a cause of the abnormality is one of a) a minor collision, b) a disaster excluding the minor collision, or c) a spontaneous failure of the in-vehicle system based on at least one of a content of the abnormality, the subject vehicle information, the surrounding environment information, and the road information when detecting the abnormality;
determine a situation around the vehicle based on at least one of the subject vehicle information, the surrounding environment information, and the road information when detecting the abnormality;
determine a target stop position for stopping the vehicle in a stoppable location based on the cause of the abnormality and the situation around the vehicle;
change the first travel plan to a second travel plan for stopping the vehicle to the target stop position; and
execute the second travel plan and control the vehicle to stop at the target stop position, wherein
when the cause of the abnormality is the disaster excluding the minor collision, a vicinity of the vehicle or a place spaced from a periphery of the vehicle is determined as the target stop position based on a type of the disaster, and
when the cause of the abnormality is any one of a flood, a fire, and a sediment disaster in the disaster excluding the minor collision, a safe place spaced from the periphery of the vehicle is defined as the target stop position.

15. An electronic control device comprising:
a travel plan storage configured to store a first travel plan for arriving at a destination by autonomous driving of a vehicle;
an information acquisitor configured to acquire at least one of subject vehicle information related to the vehicle, surrounding environment information related to a surrounding environment of the vehicle, and road information related to a road on which the vehicle travels;
an abnormality detector configured to detect an abnormality that has occurred in an in-vehicle system of the vehicle during autonomous driving based on the first travel plan;
a cause identifier connected with the information acquisitor and the abnormality detector, and configured to identify whether a cause of the abnormality is one of a) a minor collision, b) a disaster excluding the minor collision, or c) a spontaneous failure of the in-vehicle system based on at least one of a content of the abnormality, the subject vehicle information, the surrounding environment information, and the road information when the abnormality detector detects the abnormality;
a situation determiner connected with the information acquisitor and the abnormality detector, and configured to determine a situation around the vehicle based on at least one of the subject vehicle information, the surrounding environment information, and the road information when the abnormality detector detects the abnormality;
a travel plan changer connected with the travel plan storage, the cause identifier, and the situation determiner, and configured to determine a target stop position for stopping the vehicle in a stoppable location based on the cause of the abnormality and the situation around the vehicle, and to change the first travel plan to a second travel plan for stopping the vehicle to the target stop position; and
a travel plan executor configured to execute the second travel plan and to output a control signal to a vehicle controller configured to control the vehicle so that the vehicle stops at the target stop position changed by the travel plan changer, wherein
when the cause of the abnormality is the disaster excluding the minor collision, the travel plan changer determines a vicinity of the vehicle or a place spaced from a periphery of the vehicle as the target stop position based on a type of the disaster, and
when the situation around the vehicle is not safe, a safe place spaced from the periphery of the vehicle is defined as the target stop position.

16. A vehicle control program product stored in a computer-readable non-transitory tangible storage medium, comprising instructions executed by a computer to:
acquire at least one of subject vehicle information related to a vehicle, surrounding environment information related to a surrounding environment of the vehicle, and road information related to a road on which the vehicle travels;
detect an abnormality that has occurred in an in-vehicle system of the vehicle during autonomous driving based on a first travel plan stored in a travel plan storage for the vehicle to arrive at a destination;
identify whether a cause of the abnormality is one of a) a minor collision, b) a disaster excluding the minor collision, or c) a spontaneous failure of the in-vehicle system based on at least one of a content of the abnormality, the subject vehicle information, the surrounding environment information, and the road information when detecting the abnormality;
determine a situation around the vehicle based on at least one of the subject vehicle information, the surrounding environment information, and the road information when detecting the abnormality;
determine a target stop position for stopping the vehicle in a stoppable location based on the cause of the abnormality and the situation around the vehicle;
change the first travel plan to a second travel plan for stopping the vehicle to the target stop position; and
execute the second travel plan and control the vehicle to stop at the target stop position, wherein
when the cause of the abnormality is the disaster excluding the minor collision, a vicinity of the vehicle or a place spaced from a periphery of the vehicle is determined as the target stop position based on a type of the disaster, and when the situation around the vehicle is not safe, a safe place spaced from the periphery of the vehicle is defined as the target stop position.

* * * * *